United States Patent [19]
Grigorian et al.

[11] Patent Number: 5,791,310
[45] Date of Patent: Aug. 11, 1998

[54] ADAPTER SYSTEM FOR ENGINE FLUSHING APPARATUS

[75] Inventors: Victor A. Grigorian, Glendale; Martin Renwick; Seymour Seplow, both of Sherman Oaks, all of Calif.

[73] Assignee: Envirolution, Inc., Glendale, Calif.

[21] Appl. No.: 703,051

[22] Filed: Aug. 26, 1996

[51] Int. Cl.⁶ ............................................... F01M 11/04
[52] U.S. Cl. .................................... 123/196 A; 184/1.5
[58] Field of Search ..................... 123/196 A, 196 S; 184/1.5

[56] References Cited

U.S. PATENT DOCUMENTS

| | | |
|---|---|---|
| 3,431,145 | 3/1969 | Riley . |
| 3,489,245 | 1/1970 | Broadwell . |
| 3,797,507 | 3/1974 | Jackson . |
| 4,951,784 | 8/1990 | Bedi ........................... 123/196 A |
| 5,048,578 | 9/1991 | Dorf et al. . |
| 5,063,896 | 11/1991 | Hyatt et al. . |
| 5,094,201 | 3/1992 | Bedi ........................... 123/196 A |
| 5,131,421 | 7/1992 | Hofbauer . |
| 5,168,844 | 12/1992 | Waelput . |
| 5,232,513 | 8/1993 | Suratt et al. . |
| 5,452,695 | 9/1995 | Bedi ........................... 123/196 A |
| 5,467,746 | 11/1995 | Waelput et al. ............... 123/196 A |
| 5,474,098 | 12/1995 | Grigorian et al. . |
| 5,526,782 | 6/1996 | Bedi et al. ................... 123/196 A |
| 5,566,781 | 10/1996 | Robert et al. ................ 123/196 A |

*Primary Examiner*—Erick R. Solis
*Attorney, Agent, or Firm*—Fulwider Patton Lee & Utecht, LLP

[57] ABSTRACT

The adapter assemblies for an engine flushing system includes an oil filter port adapter assembly and an oil drain plug port adapter assembly for connection between an engine flushing apparatus and the lubrication system of an internal combustion engine. A plurality of adapter members of the oil filter adapter assembly are releasably secured together by a low tolerance sliding fit and indexed together by indexing pins in a low tolerance sliding fit, to prevent the connection between the adapter members from seizing up. In one embodiment, for a recessed, cartridge-type oil filter port accessible via the drain pan, the filter port adapter assembly comprises a first filter port adapter member, one end of which is placed within the filter port, and a second end of which is connected to the fluid supply conduit connected to the flushing apparatus. A second filter port adapter member having an internal passageway for receiving the second end of the first filter port adapter member is externally threaded to be connected within a correspondingly internally threaded opening of the drain pan.

17 Claims, 8 Drawing Sheets

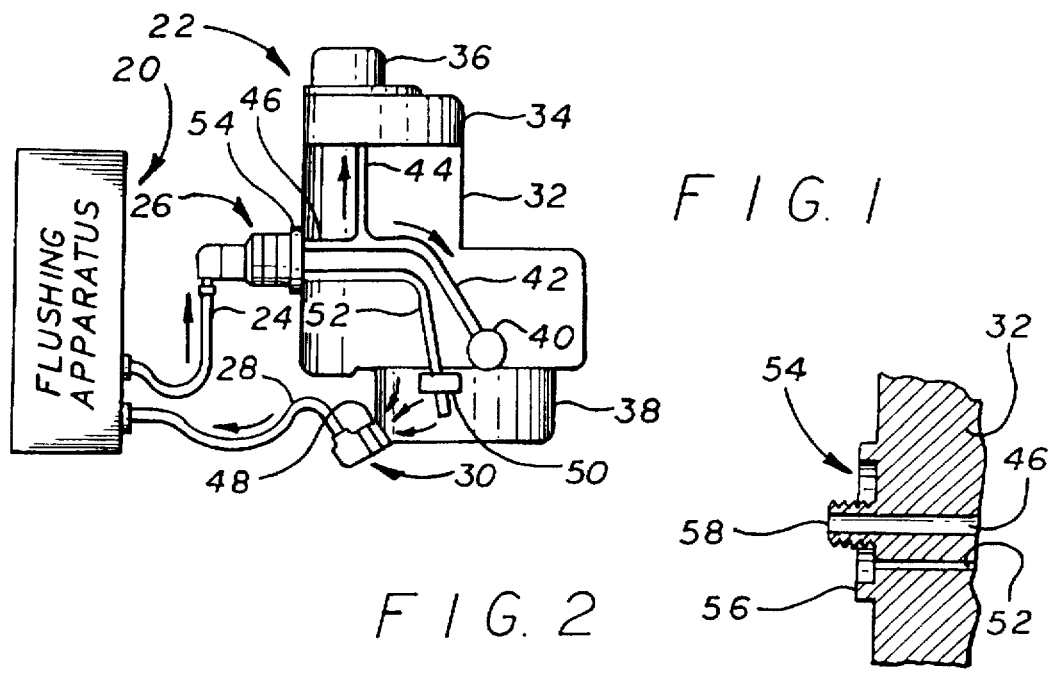
FIG. 1
FIG. 2
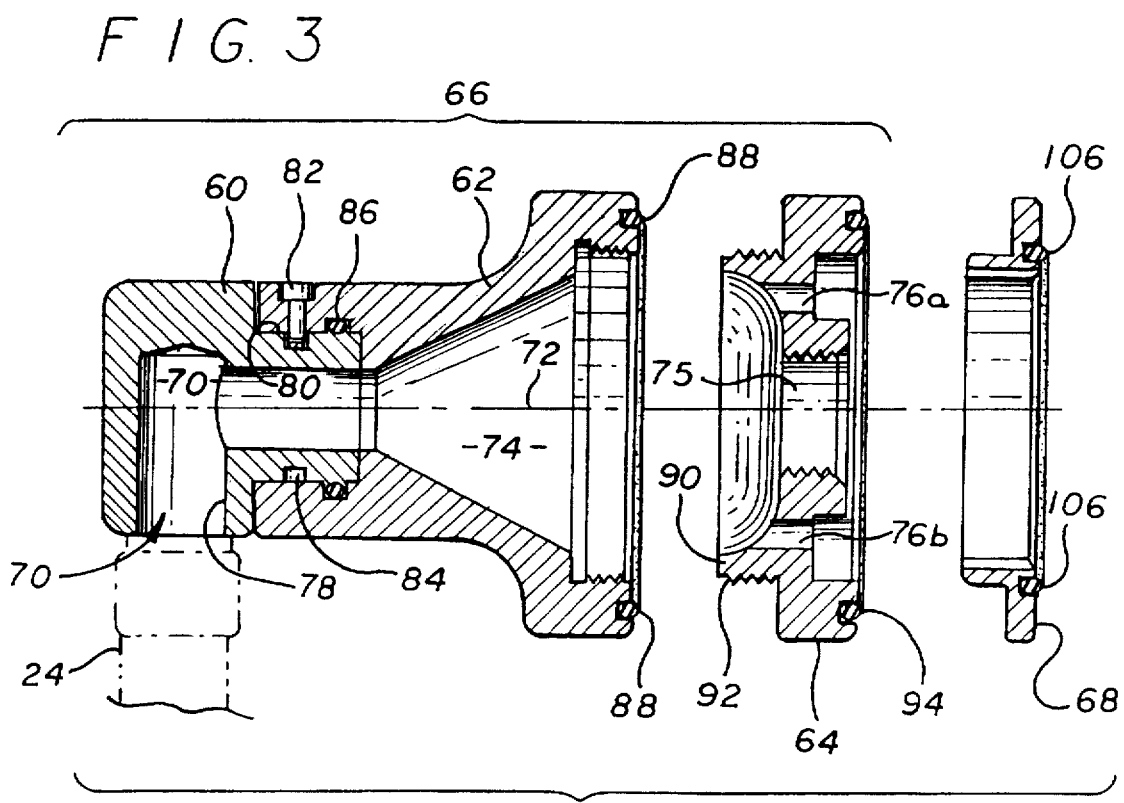
FIG. 3

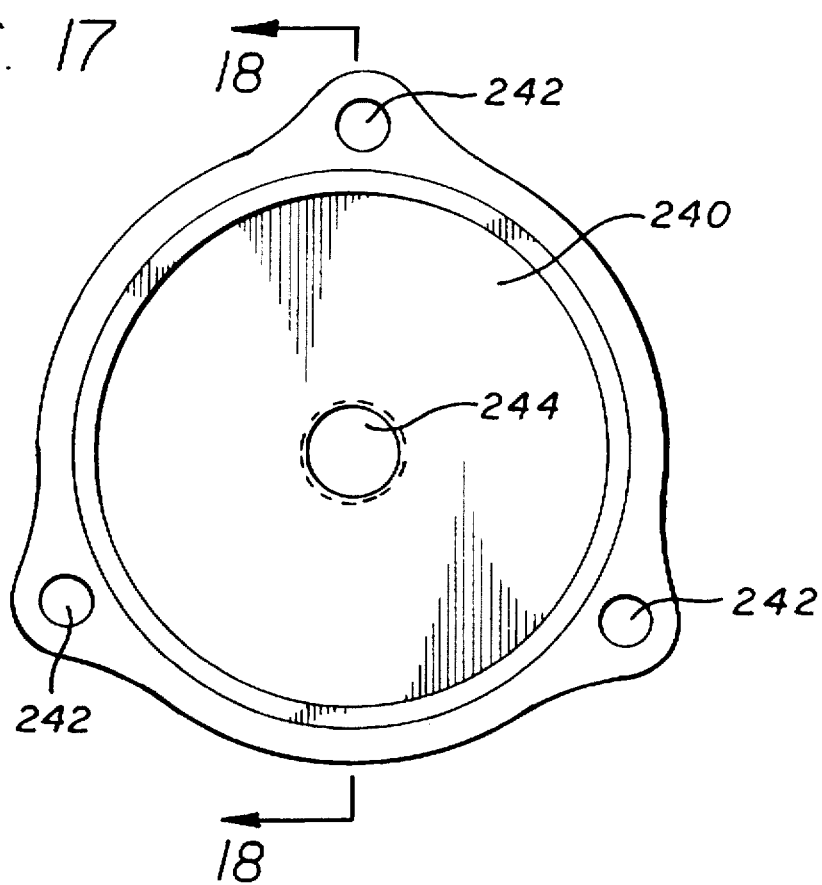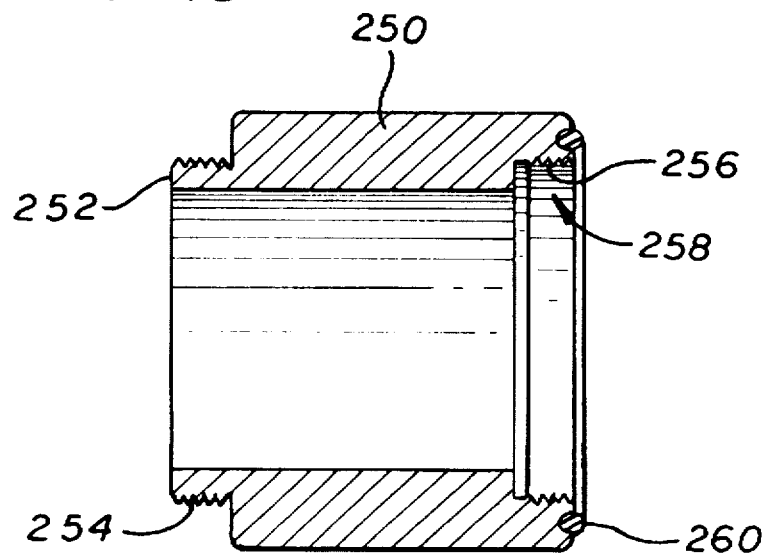

ADAPTER SYSTEM FOR ENGINE FLUSHING APPARATUS

BACKGROUND OF THE INVENTION

1. Field of the Invention

This invention relates generally to a flushing apparatus for internal combustion engines, and more particularly concerns a novel adapter system for use in such apparatus, enabling the flushing apparatus to be connected to the oil drain pan and/or lubricating system of a large variety of internal combustion engines.

2. Description of Related Art

During operation of the internal combustion engine, oil, essential to operation of the engine, is taken from the oil pan, where stored, and circulated throughout the engine to lubricate the internal moving parts, including the crank shaft, cam shaft and pistons, to thereby minimize friction and wear of the engine's moving parts. For optimal engine operation and life, and for effective lubrication, the oil must be clean and maintain its lubricating qualities. To keep the oil free of the larger metal particles and dirt that inevitably are created and accumulate in the oil with continued engine use, a replaceable oil filter is carried on each engine. Additionally, to eliminate the more minute particles and acid that builds up in the oil, which the filter cannot remove, the engine oil pan is periodically drained and replenished with new oil; and a new oil filter is typically installed.

Even with such periodic maintenance not all the foreign particles are removed. Over time an oily "sludge" is formed within parts of the engine from such foreign particles, particularly in the oil drain pan. That sludge degrades engine performance. It also can release particles after the oil has been replaced, and the presence of those particles in the oil leads to premature engine wear.

To reach and remove that sludge without disassembling the engine, an engine flushing apparatus is known which treats the engine with a cleaning solution, circulating the cleaning fluid through the engine and oil drain pan from which the engine oil has been drained. In such an flushing apparatus a conduit, typically a hose, capable of withstanding fluid under pressure, is connected to the oil filter port leading to the engine's lubrication system. Another conduit is connected to the drain plug port at the engine's oil pan. The flushing fluid is circulated from the apparatus through one conduit, into the engine, whereby the fluid ideally dissolves the sludge and collects any foreign particles in suspension. The flushing fluid exits the engine with the dissolved and suspended waste via the oil pan drain port and the second conduit, through which the now "dirty" flushing fluid is returned to the flushing apparatus for further processing or disposal.

Such conventional flushing apparatus continues circulating the cleaning fluid for a prescribed treatment period, which is a standard duration, irrespective of the make and model of the automobile. Since the size and type of oil filter port and oil pan drain port differs from automobile manufacturer to manufacturer and even amongst different models or model year of a single auto manufacturer, the prior flushing apparatus includes a necessary set of associated adapters to permit connection of the conduits to the respective oil filter and drain plug ports of the vast majority of automobile engines.

One conventional oil filter mounting assembly typically contains two oil conduits or passages, one formed through the hollow of the threaded mounting post, which leads from the oil filter to the crankshaft and other moving parts within the engine block, and at least one additional passage alongside, which leads to the engine oil pump. The cleaning solution being pumped by the flushing equipment through the oil filter is divided in the adapter and flows through both passages, cleaning the rocker arm assembly and the like accessible to the fluid through the first port passage, and cleaning the oil pump accessible through the second port passage. Typically the flushing equipment controls, among other things, the duration of flushing fluid flow, fifteen minutes, for example, and all automobile engines, no matter what make or model, receive the same fifteen minute duration of treatment.

It has been found that threaded connections between filter port adapters and an engine filter port can lock or seize up when the threaded connections of a filter port universal coupling member and filter port adapter work against each other during removal from an engine filter port, which can damage the threaded connections of the filter port adapters, and can make removal and disassembly of the flushing apparatus difficult and time consuming.

It would therefore be desirable to provide a lubrication adapter assembly that can be coupled together to provide for sealed fluid communication between an engine and a flushing apparatus, and that can be readily disassembled after flushing of an engine, without locking or seizing up of the adapter assembly.

In fitting adapters to the engine, one finds that the many components and accessories packed in the engine compartment of modern automobiles provide formidable obstructions to connection of the flushing apparatus to the oil filter port and to the oil drain pan port. Accordingly, it would also be desirable to provide configurations for adapter assemblies for the oil filter port and for the oil drain pan port that can more easily fit in restricted spaces of an engine compartment during the flushing operation. The present invention meets these needs.

SUMMARY OF THE INVENTION

Briefly, and in general terms, the present invention provides for an improved flushing system for cleaning internal combustion engines of a wide variety of makes and models that employs the engine's oil filter port to deliver the flushing fluid to ensure that a flushing fluid is delivered through the oil filter port to the engine components, such as the crankshaft, and to other components, such as the oil pump and drain pan, irrespective of the make or model of engine.

The present invention accordingly provides for a flushing apparatus for internally cleaning internal combustion engines. The flushing apparatus includes an adapter system with an oil filter port adapter assembly and an oil drain plug port adapter assembly. For a given engine a selected oil filter port adapter assembly couples the fluid conduit from the flushing apparatus to the oil filter port on the engine block. In one presently preferred embodiment, the invention provides for an improved engine flushing system for circulating flushing fluid through an internal combustion engine to clean the internal combustion engine, the engine being of the type containing an engine block, an oil filter port on the engine block and an oil drain pan having an oil drain plug port. The engine flushing system typically includes a flushing apparatus for delivering a volume of flushing fluid and receiving used flushing fluid, a first conduit for conducting flushing fluid from the flushing apparatus to the oil filter port, and second conduit for conducting flushing fluid from the oil drain plug port to the flushing apparatus. An oil filter port adapter assembly is provided for connecting the first conduit to the oil filter port, and the oil filter port adapter assembly preferably includes a plurality of adapter members. In a currently preferred aspect of the invention, the plurality of adapter members of the adapter assembly are mated together with a low tolerance sliding fit, and indexed by indexing pins with a low tolerance sliding fit into the adapter pieces, to provide for a secure connection between the plurality of adapter members without allowing the connection between the adapter members to seize up. In one presently preferred embodiment, the oil filter adapter assembly includes a primary adapter assembly, and a secondary adapter, and the indexing means comprises a plurality of indexing pins with first and second ends, a plurality of primary adapter indexing pin receptacles provided in the primary adapter assembly for receiving the first ends of the indexing pins in sliding fit engagement, and a plurality of secondary adapter indexing pin receptacles provided in the secondary adapter for receiving the second ends of the indexing pins in sliding fit engagement. In a presently preferred embodiment, the primary adapter assembly comprises of a plurality of adapter pieces which are selectively usable at the oil filter port individually or in combination with the secondary adapter fitting to the oil filter port of substantially most internal combustion engines and creating a liquid tight seal therewith. In one presently preferred embodiment, each primary adapter assembly also includes a base portion and conduit coupling means for coupling the primary adapter assembly to the first conduit from the flushing equipment.

In another aspect of the invention, an improved configuration for a companion assembly of oil drain plug port adapters for the flushing apparatus allows the oil drain plug port adapters to be utilized in restricted spaces. In one presently preferred embodiment, the drain pan port adapter assembly includes a right angle base portion having a bevelled shoulder configuration for fitting in restricted spaces of an engine compartment. In another presently preferred embodiment, the drain pan port adapter assembly comprises a first drain port adapter member having an internal fluid passageway, a first end adapted to be placed within the drain pan port of the engine for fluid communication with the drain pan port, and a second end adapted to be connected in fluid communication with the second conduit connected to the flushing apparatus. A second drain port adapter member having an internal passageway for receiving the second end of the first drain port adapter member is also provided, and is externally threaded to be connected within a correspondingly internally threaded opening of the drain pan. The first end of the first drain port adapter member includes a flange having a peripheral O-ring for sealing the internal connection within the drain pan port. The second end of the first drain port adapter member is preferably externally threaded for accepting an internally threaded nut for securing the first drain port adapter member to the second drain port adapter member in a fluid tight seal. O-ring seals are also provided on the second drain port adapter member for sealing engagement of the second drain port adapter member with the flange of the first drain port adapter member and with the drain pan.

These and other aspects and advantages of the invention will become apparent from the following detailed description, and the accompanying drawing, which illustrates by way of example the features of the invention.

BRIEF DESCRIPTION OF THE DRAWINGS

FIG. 1 schematically illustrates the engine flushing system in operation, including the flushing apparatus, an engine, and the adapters;

FIG. 2 is a partial sectional view of the oil filter port of the engine;

FIG. 3 is an exploded cross sectional view of one embodiment of an oil filter port adapter assembly of the invention;

FIG. 17 is an alternate embodiment of a cover plate adapter similar to that of FIG. 15;

FIG. 19 is a cross-sectional view of an intermediate adapter for placement between the universal adapter coupling and the principal adapter for long-stem oil filter posts.

DETAILED DESCRIPTION OF THE PREFERRED EMBODIMENTS

Figure 4:
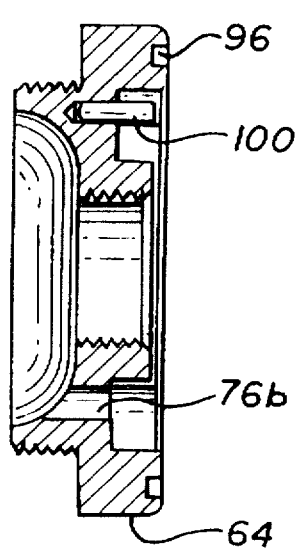
FIG. 4 is an elevational cross sectional view of a principal adapter of the filter port adapter assembly of FIG. 3 taken across line 4—4 of FIG. 5.

In order to remove sludge from an internal combustion engine, an engine flushing apparatus can be used to circulate a flushing fluid through the engine and oil drain pan from which the engine oil has been drained. A conduit connected to the oil filter port by threaded filter port adapters can lock or seize up during removal of adapters from an engine, potentially damaging the filter port adapters, and making removal and disassembly of the flushing apparatus difficult and time consuming. The area of an engine compartment can also impose strict space limitations on an adapter assembly connected between the flushing apparatus and the drain plug port at the engine's oil pan.

As is illustrated in the drawings, the invention is accordingly embodied in an improved adapter system for an engine flushing system for circulating flushing fluid through an internal combustion engine to clean the internal combustion engine. Referring to FIG. 1, an engine flushing apparatus 20 incorporating the adapters of the present invention for flushing the lubrication system of an internal combustion engine 22, includes a conduit or hose 24 connecting the fluid output from the flushing apparatus to engine 22 by an oil filter port adapter assembly 26, and a second conduit or hose 28 returning flushing fluid to the flushing apparatus by means of oil drain pan port adapter assembly 30 that is connected to the oil drain pan of the engine.

The operating components of the flushing equipment and of the engine are neither illustrated nor described in detail since they are well known, are of a conventional structure and do not form a part of the present invention. However, a conventional flushing apparatus 20 typically contains the flushing fluid, typically a known cleaning solution, which is pumped from the flushing apparatus and is outputted through hose 24 to the engine. The returned "dirty" flushing fluid is piped back to the flushing apparatus through hose 28. The flushing apparatus includes appropriate electrical controls, not illustrated, to initiate operation, and an electronic digital computer for controlling the operation of the various controls and the duration of the flushing treatment.

The oil filter port typically includes a first oil passage into the engine block for routing oil from the oil filter port to the crankshaft and other internal engine components and a second oil passage for routing fluid from the drain pan and oil pump to the oil filter port. The flushing apparatus typically delivers a volume of flushing fluid through a first conduit to the oil filter port, and receives used flushing fluid through a second conduit from the oil drain plug port.

Engine 22 includes an engine block 32 which contains a cylinder head 34 and valve cover 36. An oil pan 38 is secured to the lower end of the engine. A crankshaft 40 within the engine block receives oil from passage 42. In like manner, the valves and other components within the engine block including the piston cylinder arrangement receive lubricating oil through a second oil passage 44. Oil is supplied to passages 42 and 44 by passage 46, from which the former passages branch out.

The oil pan is provided with a drain plug port 48, which has a threaded opening. In normal engine operation, a threaded drain plug, not illustrated, is screwed into place sealing the drain pan and is removed only when it is desired to drain used oil from the engine.

An oil pump 50 located within oil pan 38 is connected by a fluid passage 52 to an oil filter port 54. In normal engine operation a conventional oil filter, not illustrated, is connected at this port. Engine oil is pumped by pump 50 from oil pan 38 via conduit 52 through the filter, exits the filter and flows via conduits 46, 42 and 44 into the engine, allowing the filter to remove particulate material and other impurities that may be contained in the oil before reaching crankshaft 40 and other engine components.

The oil filter port of most modern American automobiles is intended for self-contained spin-on type filters, such as the type FL-1A sold under the Motorcraft brand. As represented in the partial section view of FIG. 2, such a design of an oil filter port 54 contains an annular border seal surface 56 encircling a projecting central hollow post 58, the latter defining a portion of a passage 46 into the engine block. Passage 46 typically branches into passages 42 and 44, as shown in FIG. 1. Another passage 52 into the engine block is located between post 58 and the bordering seal surface 56. The hollow post provides an oil passage into the engine block and serves as a mounting post for the spin-on oil filter. The conventional oil filter comprises a sealed cartridge, containing a threaded central passage, adapted to be screwed onto the oil filter port mounting post, and contains other passages peripheral of the central passage, intended for fluid communication with a passage in the oil filter port.

The present invention comprises an adapter system including an oil filter adapter assembly and drain pan port adapter assembly, which are illustrated in FIGS. 3 through 13 of the drawings. The oil filter port adapter assembly associated with the flushing apparatus preferably includes a universal coupling member or base, as variously termed, a set of principal adapters, and a set of secondary adapters. In forming an oil filter port adapter assembly for a particular engine application, a principal adapter of the correct size to fit the particular engine oil port mounting post is selected from the set and is mounted to the universal coupling member. The principal adapters are sized to couple to the oil filter's threaded mounting posts of various makes and models of automobiles and to divide the flushing fluid flow from the inlet side into different branches on the outlet side of the adapter element as hereinafter described in greater detail, and as is described in U.S. Pat. No. 5,474,098, which is incorporated herein by reference. The secondary adapters are used to compensate for different size annular oil port seal surfaces in instances where the principal adapter does not fit the annulus. Each secondary adapter mounts to any of the principal adapters.

With reference to FIG. 3, the oil filter adapter assembly includes a base or universal adapter coupling, as variously termed, formed in two parts, base members 60 and 62, a principal adapter 64, sometimes referred to as an oil filter port post adapter, and a secondary adapter 68, sometimes referred to as an oil filter port outer diameter adapter. The combination of the base members 60 and 62, and principal adapter 64 comprise the primary oil filter adapter assembly 66. Each of the foregoing are formed of metal, suitably aluminum. In general, the adapter coupling, as well as the attached adapters, have a generally cylindrical shape to the outer surface. These elements are assembled together in serial order in a nesting relationship, as will be described further below. The individual portions of the oil filter port adapter assembly define an internal fluid passage from the input tube 70 and through the assembly, that extends laterally, for the most part, along axis 72, and branches at adapter 64 into essentially two passages the first of which is the large central passage 74 along axis 72, which ultimately is coupled through to the passage in the hollow mounting post of the oil filter port, and the second of which extends through the smaller sized openings, only two of which 76a and 76b, are illustrated in the figure, that couple to the secondary passage in the oil filter port.

Base portion 60 contains an input pipe fitting 78 that is connected to the first conduit 24 from the flushing equipment. The pipe fitting leads into internally formed pipe threads in a passage oriented orthogonal to the axis of the base portion, which intersects the axially extending passage 74. A protruding axially extending hollow circular male coupling member 80 extends into mating engagement within a corresponding cylindrical walled portion of the complementary base member 62, the female portion of the coupling between the two portions to provide a secure fluid passage. Except for passage 70 and set screw 82 and the latter's screw passage, discussed hereafter, the coupler geometry is generally symmetrical about center line or axis 72.

An annular slot 84 in the outer wall of cylindrical portion 80 circumscribes the outer peripheral surface, that is, the slot extends about the passage axis. Complementary member 62 contains a threaded passage that extends through the outer wall orthogonal to the passage axis in an axial position that overlies slot 84. With the two members assembled together, a set screw 82 is threaded into the threaded passage and is screwed down until it extends into slot 84. This serves to prevent the two coupling parts from separating by being pulled apart. It also allows the two members to rotate in position relative to one another, since the end of the set screw rides along the peripheral slot. With the rotatable mounting between the coupling elements one may grip hose 24 and rotate base member 60 as may assist in installing the oil filter port adapter assembly in situations where there is limited clearance and/or obstructions in the automobile's engine compartment.

Because the universal coupling is formed in two parts as described, a potential fluid leakage path exists at the juncture between those two elements. As an additional feature of the invention, the base member incorporates a rotary gland, a conventional sealing device for rotary members. Forming the gland, the inside cylindrical wall of member 62 contains an annular slot axially positioned within the female coupling portion thereof that circumscribes portion 80 of the complementary base member. An O-ring seal 86 is seated within that slot and frictionally engages the outer surface of the male member 80 as well as the walls of the slot. The seal serves to prevent fluid in the internal passage from escaping the coupling parts. It also allows one of the base members 60 and 62 to rotate relative to the other, whereby during rotation one such base member slides along the surface of the seal.

At the right end coupling member 62 is flared to an enlarged diameter. The right facing rim of that short section contains a peripherally extending slot that in turn seats an O-ring seal 88, which in turn seals against a confronting rim of principal adapter 64, assembled thereto as illustrated.

Figure 5:
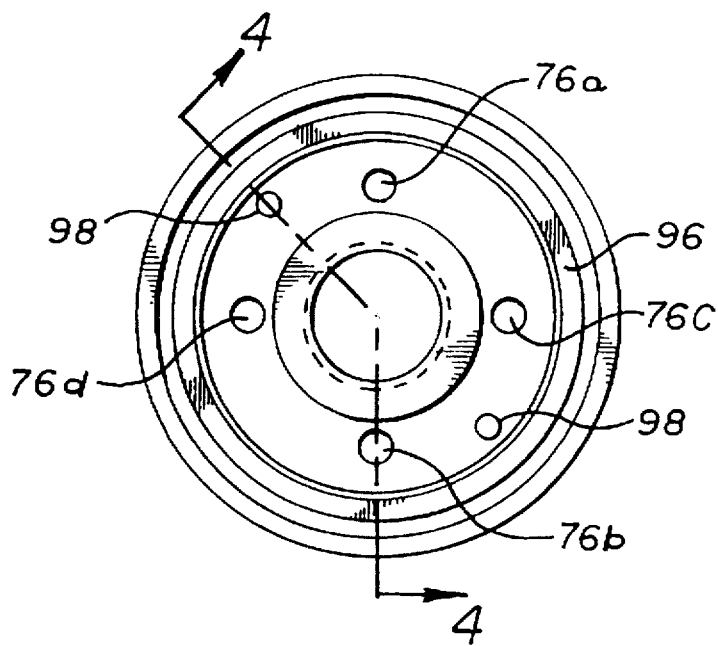
FIG. 5 is a plan view of the principal adapter of FIG. 4.
Figure 7:
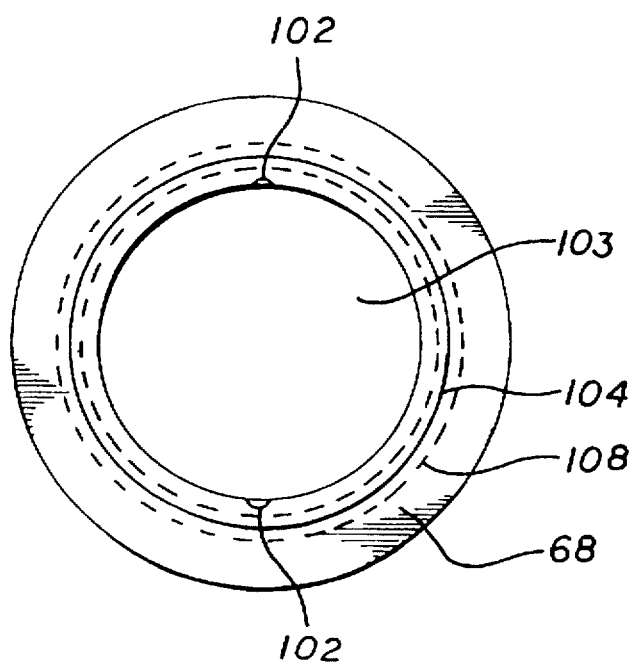
FIG. 7 is a plan view of the secondary adapter of FIG. 6.
Figure 6:
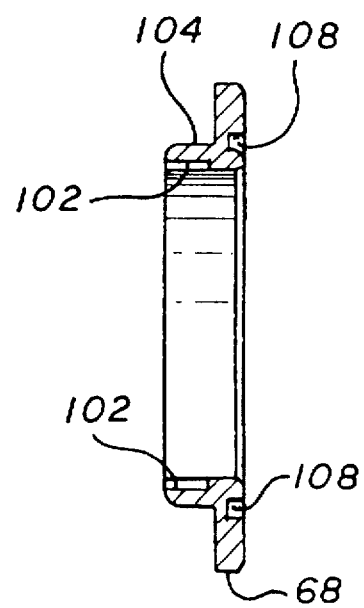
FIG. 6 is an elevational cross sectional view of a secondary adapter of the filter port adapter assembly of FIG. 3.
Figure 8:
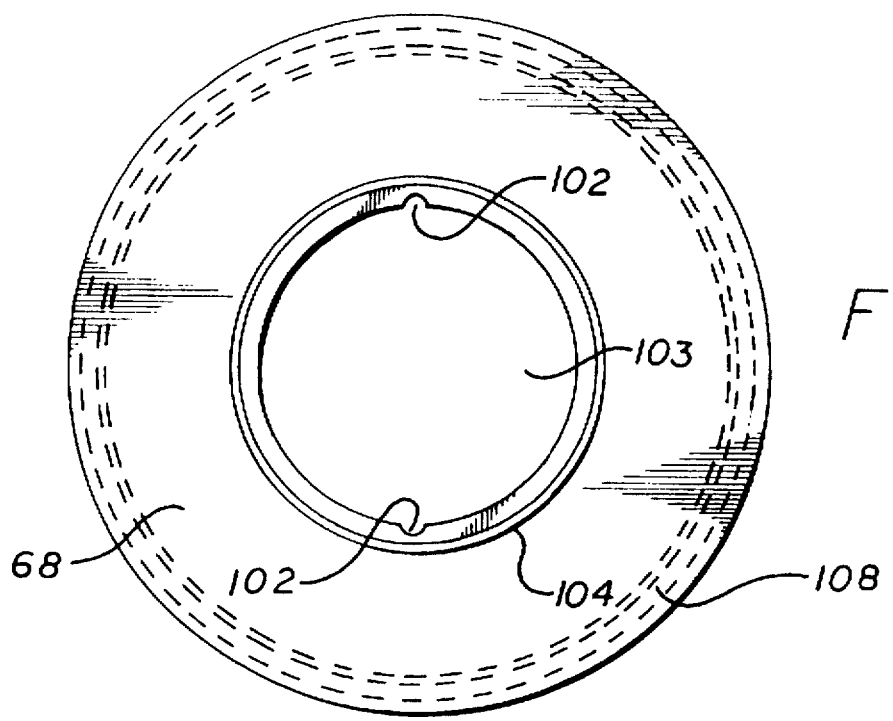
FIG. 8 is a plan view of a second preferred embodiment of a secondary adapter of the filter port adapter assembly of FIG. 3.
Figure 9:
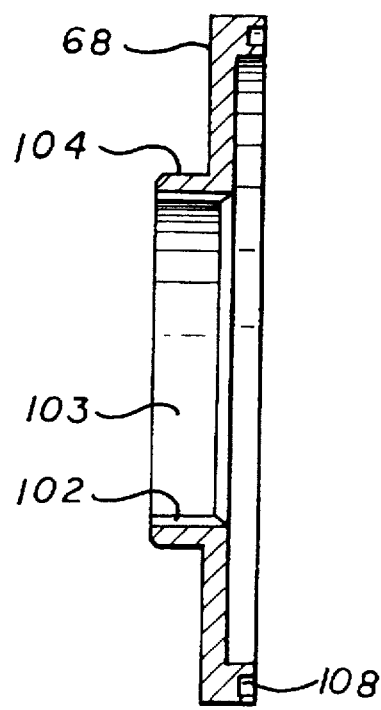
FIG. 9 is an elevational cross sectional view of the secondary adapter of FIG. 8.

Referring to FIGS. 3, 4 and 5, the principal adapter 64 is a generally disk shaped member, typically formed of aluminum, containing a protruding cylindrical portion 90 or hub having a threaded outer surface 92 for connection to a correspondingly threaded portion of the base member 62, illustrated in FIG. 3. A circular rim portion to the principal adapter which borders the outer edge is flat in geometry so that, when assembled to the coupling member 62, the surface provides a better seal to O-ring seal 88 on the base portion. On the opposite side, principal adapter 64 includes an O-ring seal 94. The O-ring seal is seated within a groove or slot 96, as variously termed, visible in FIG. 5, that is formed within and recessed from the outer surface of the rim and peripherally encircles the rear face of the principal adapter. Also formed within and recessed from the outer surface of the rim are a plurality of first indexing pin receptacles 98 for receiving first ends of a corresponding number of indexing pins 100 or dowels in press fit or friction fit engagement. A secondary adapter 68 with a corresponding plurality of second indexing pin receptacles 102 for receiving the second ends of the indexing pins in a low tolerance sliding fit permits the secondary adapter to be secured between the engine filter port and the primary adapter assembly, and indexed to the primary adapter assembly, so that the connection between the primary and secondary adapters and the engine filter port will not seize up or lock up. While two indexing pins are preferably used to index the primary adapter assembly to the secondary adapter, additional indexing pins may also be utilized.

The cylindrical hub 90 on the reverse face of the principal adapter surrounds a bowl shaped portion recessed from the front face. A large circular axially extending passage 75 is located within the principal adapter, extending through the bottom of the bowl shaped recessed portion. Four identical axially extending passages 76a, 76b, 76c and 76d are symmetrically distributed about and are equidistant from the central passage 75.

It should be appreciated that central passage 75 is larger in cross sectional area than any of the smaller passages 76a–76d, and that passage 46 through the oil filter mounting post 58, is also larger than any of those smaller passages. During operation in which the oil filter port adapter is assembled onto the oil filter mounting post with passage 75 threadingly secured to the threaded exterior of the oil port's mounting post, the flow of cleaning fluid through the cross section area of the central passage, essentially the cross section area of passage 46 in the oil filter mounting post, A1, is intended to be larger than the flow collective cross section areas of all of those small passages, A2, A3, A4, and A5, in total, At. The selected flow ratio between the flow through the cross section area of the central passage, A1, defined by the hollow of the mounting post, to the flow through the total cross section areas of the individual smaller passages, At, is typically approximately 4:1.

Principal adapter 64 is one of a set of such pieces, all of which can be joined to the universal coupling 62. Six or more of such adapters are typically employed, differing from one another essentially in the size of the central passage 75 and the size of the peripheral passages 76a–76d.

The same flow ratio is typically used in all of the principal adapters, and the flow ratio thus selected or otherwise derived is a constant. The diameter, configuration and conductance of the adapter passages serves as a means to regulate or control the relative distribution and flow of the flushing fluid being pumped from the flushing equipment to one side of the adapter as between the engine channels directed to the oil pump and those oil passageways directed to the principal engine components. While four small passages are used in this embodiment, it is recognized that in other embodiments, different numbers of small passages may be used.

It is recognized that perhaps some model of a prior adapter, which must also contain at least a central and outer passage in the adapter, may contain a flow ratio between the cross section areas that falls within the aforedescribed range of 2 to 8, and, indeed may contain one that by chance, would have a ratio of four, purely by chance, although the present applicant's have not investigated and/or verified any such prior adapters, but to applicant's present knowledge, whatever the ratio may be, the identical ratio is not maintained throughout the set of adapters associated with such flushing apparatus. In those instances, as earlier described in the background to this specification, for a given prior flushing apparatus, containing multiple adapters, the flow ratio for the cleaning fluid varies from engine to engine with different adapters in the flushing apparatus.

The next step in the assembly is to select and install the secondary adapter, 68. Adapter 68 is one of a set of such adapters that includes other adapters, such as are illustrated in FIGS. 6–9. Each of those secondary adapters is of a different outer diameter and have different diameter o-ring seals, appropriate to the different outer diameters of the oil filter port of different automobiles. The secondary adapter contains a large central opening 103, and so cannot obstruct the fluid which exits from the two sets of passages in principal adapter 64. And each of the adapters contains an annular seal surface that is flat and, when assembled abuts against o-ring seal 94 of the principal adapter. The annular seal surface of larger secondary adapters is preferably formed as an annular channel or recess so as to allow the outer edge of the principal adapter to be received in the channel in mating engagement.

Referring to FIGS. 6–9, the secondary adapter is a generally disk shaped short cylinder formed of metal, typically aluminum, that contains a short cylindrical non-threaded portion or hub 104, projecting from the front face, which serves as a male coupling to the mating principal adapter earlier selected for the assembly. O-ring seal 106 is carried by a circumferential slot 108 in the face of the secondary adapter.

For a given automobile, the secondary adapter is selected so that the O-ring seal is of like diameter and engages the seal surface of the oil filter port. Thus a variety of different diameter O-ring seals and the supporting adapter, also of different diameter, may be provided with the flushing equipment. This allows the equipment to service the vast majority of automobiles.

Figure 10:
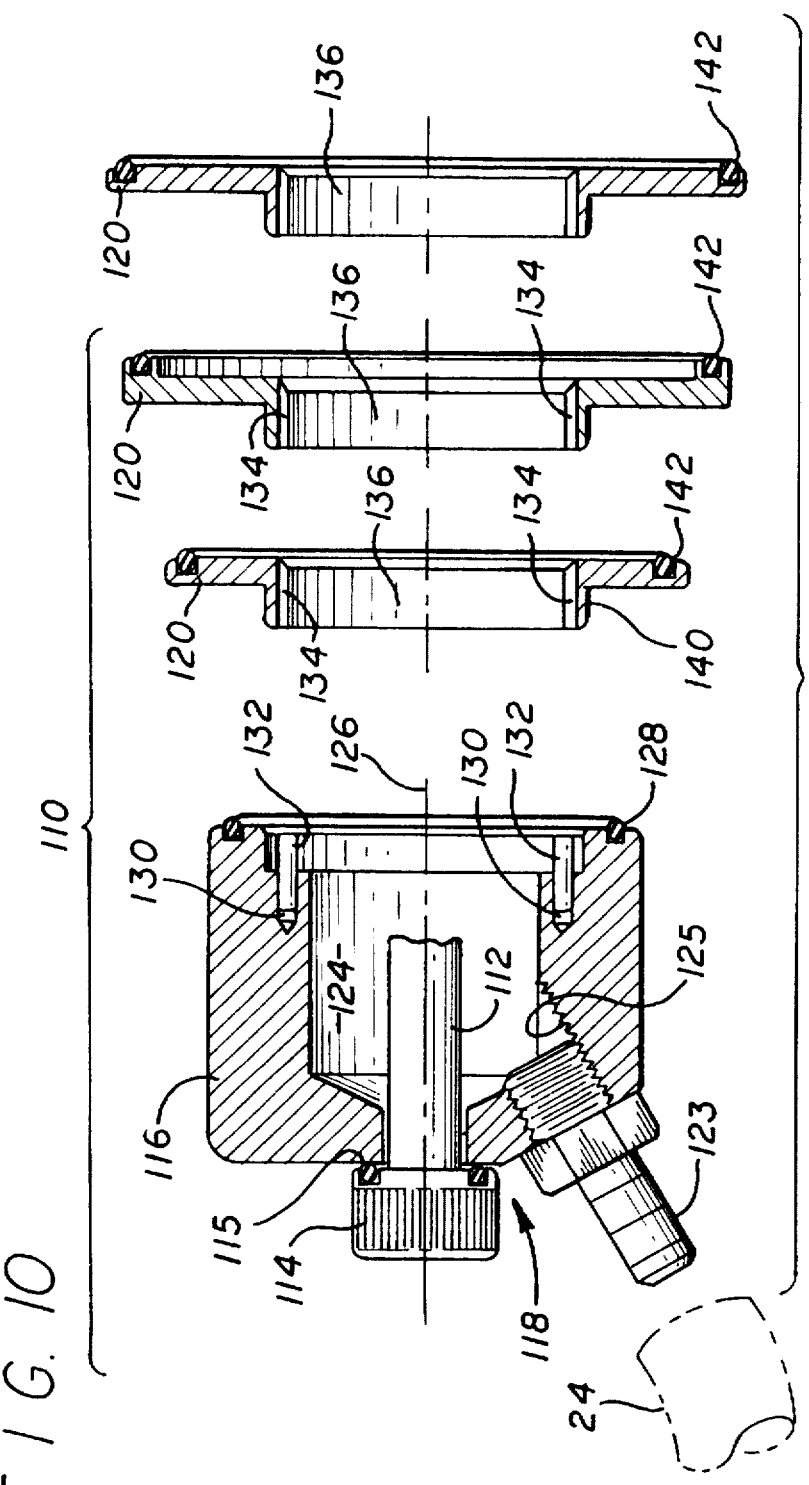
FIG. 10 is an exploded cross sectional view of a second preferred embodiment of an oil filter port adapter assembly for a cartridge type oil filter compartment of an engine, constructed in accordance with the invention.
Figure 11:
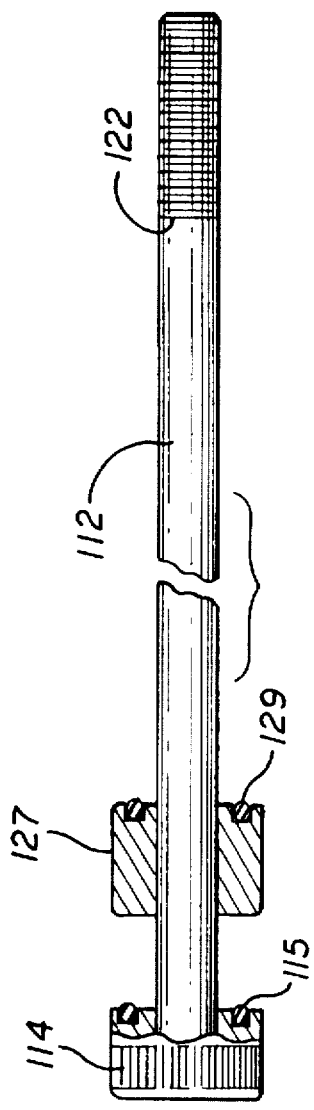
FIG. 11 shows the coupling rod of FIG. 10 for a cartridge type oil filter compartment of an engine.

With reference to FIGS. 10 and 11, the invention also provides for an alternate embodiment of the oil filter port adapter assembly 110 for use with a recessed, cartridge-type oil filter port. Briefly, in this embodiment, a coupling means such as a rod or bolt 112, including a knurled knob or nut 114 at one end, having an O-ring 115 to prevent leakage, extends through the base member 116 of the primary adapter assembly 118, as well as through a selected size of a secondary adapter 120 of the oil filter port adapter assembly. The secondary adapter selected can be the same as those shown in FIGS. 6–9. The other end of the conduit coupling means is provided with threads 122 for connection with internal threads of the recessed oil filter port (not shown). The primary adapter assembly can be connected to the first conduit 24 from the flushing apparatus by a quick connect coupling member 123, that is received in the inlet port 125 of the base member 116. The oil filter adapter assembly comprises the base member 116, the conduit coupling means, and a secondary adapter 120 to be secured between the engine filter port and the primary adapter assembly, although it may also be possible to secure the primary adapter assembly to the engine filter port directly in certain instances. The base member 116 and conduit coupling means comprises the primary oil filter adapter assembly 118. Each of the foregoing are formed of metal, suitably aluminum. In general, the adapter coupling, as well as the attached adapters, have a generally cylindrical shape to the outer surface. These elements are assembled together in serial order in a nesting relationship and are secured together by indexing means, as described above, and further described below. The individual portions of the oil filter port adapter assembly define an internal fluid passage through the inner axially extending passageway 124 of the assembly, extending along axis 126, in essentially two passages. In this embodiment, when the nut 114 and bolt 112 are tightened down, the large central passage 124 is in sealed fluid communication with the oil filter port. In order to accommodate various sizes of recessed, cartridge-type ports, one or more adapter sleeves or spacers 127 can be placed over the bolt 112, to be sealingly secured between the nut 114 and the base member 116. The adapter sleeve 127 can be of various sizes, and preferably includes an O-ring seal 129 to prevent fluid leakage.

The outer peripheral rim of the base member contains an annular slot that in turn seats an O-ring seal 128, which in turn seals against a confronting rim of a selected secondary adapter 120. Also formed within and recessed from the outer surface of the rim of the base member are a plurality of first indexing pin receptacles 130 in which first ends of a corresponding number of indexing pins 132 or dowels are disposed. A selected secondary adapter with a corresponding plurality of second indexing pin receptacles 134 for receiving the second ends of the indexing pins in a low tolerance sliding fit engagement permits the secondary adapter to be releasably secured between the engine filter port and the primary adapter assembly, so that the connection between the primary oil filter adapter assembly and the secondary adapters will not seize up or lock up. While two indexing pins are preferably used to index the primary adapter assembly to the secondary adapter, additional indexing pins may also be utilized.

Adapter 120 is preferably one of a set of such adapters, each of those secondary adapters having a different outer diameter and have different diameter o-ring seals, appropriate to the different outer diameters of the oil filter port of different automobiles. The secondary adapter contains a large central opening 136, and each of the secondary adapters contains an annular seal surface that is flat and, when assembled, abuts against O-ring seal 128 of the base member. The annular seal surface of larger secondary adapters is preferably formed as an annular channel or recess so as to allow the outer edge of the principal adapter to be received in the channel in mating engagement.

The secondary adapter is a generally disk shaped short cylinder formed of metal, typically aluminum, that contains a short cylindrical non-threaded portion or hub 140, projecting from the front face, which serves as a male coupling to the mating principal adapter earlier selected for the assembly. O-ring seal 142 is carried by a circumferential slot in the face of the principal adapter.

For a given automobile, the secondary adapter is selected so that the O-ring seal is of like diameter and engages the seal surface of the oil filter port. Thus a variety of different diameter O-ring seals and the supporting adapter, also of different diameter, may be provided with the flushing equipment. This allows the equipment to service the vast majority of automobiles.

The present invention also provides for an oil drain pan port adapter assembly. The individual adapter members of the oil drain pan port adapter assembly, can be used individually or in combination with one another for connection to the oil pan drain outlet. Referring to the FIG. 12A, the drain port adapter assembly 144 contains a two part base portion, comprising the right angle, return conduit coupling base member 146 and the rotating base member 148 that are rotatably mounted to one another by means of the rotatable joint formed by peripherally extending slot 150 in the short cylindrical male coupling portion of the conduit coupling member, which extends in mating engagement with the corresponding female opening in the adjacent portion of the rotating base member, and set screw 152, extending into the slot. In one presently preferred embodiment, the right angle base member has a bevelled shoulder 154 at the end of the right angle base member distal to the connection with the second, fluid return conduit, to allow the right angle, return conduit coupling base member to fit more easily in restricted spaces at the drain pan area of an engine compartment.

The assembly also incorporates a rotary gland, formed of O-ring seal 156 disposed within a peripherally extending slot formed in the internal cylindrical surface of the female coupling section of the rotating base portion 148. A pipe fitting 158 engages the threads of a cylindrical passage that is oriented transverse to the axis 160 of the principal passage through the oil drain pan adapter assembly. The pipe fitting is connected to the return conduit or hose 28.

Figure 12A:
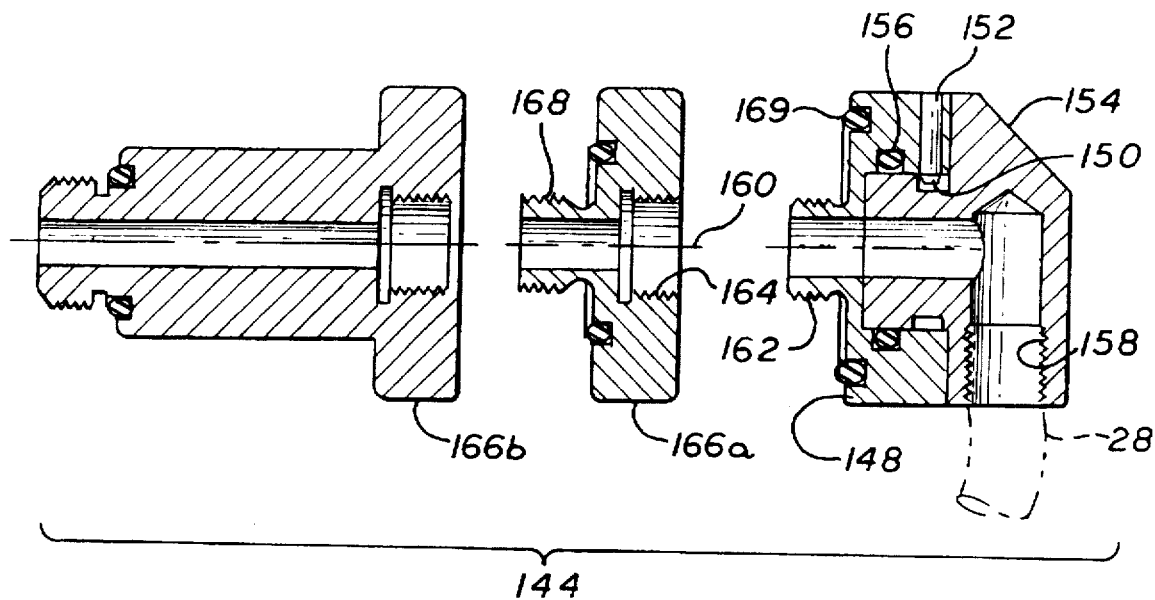
FIG. 12A is an exploded cross sectional view of a drain pan port adapter assembly intended configured for a restricted engine compartment space.
Figure 12B:
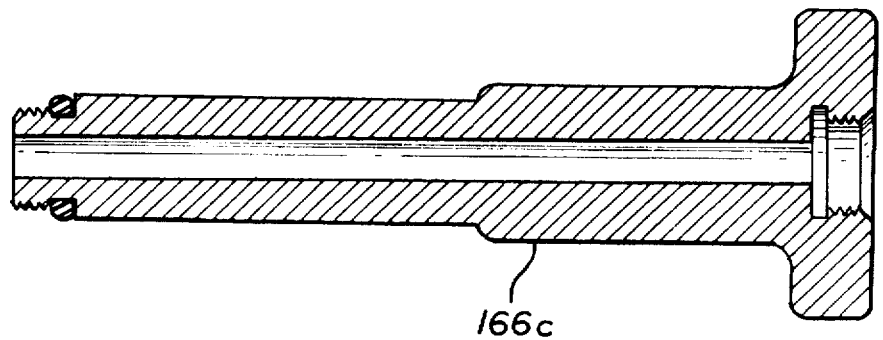
FIG. 12B is a cross-sectional view of an elongated intermediate adapter for use with the drain pan port adapter assembly of FIG. 12A.

The rotating coupling member contains a reduced diameter protruding cylinder or hub with threads 162 formed in the outer surface of the hub, for threaded engagement with the screw threads 164 on the inner cylindrical walls within the central passage in an intermediate adapter 166a, b, or c. The intermediate adapter 166a, b, or c also contains a protruding short cylindrical end portion or hub, having threads 168 formed on the outer surface of the hub. The outer annular face of coupling member 148 contains a peripheral slot, and an O-ring seal 169 is disposed in the slot. In rare cases a particular engine may have a drain plug that is recessed in the oil pan. In that instance, a longer, narrower diameter adapter 166c as shown in FIG. 12B may be used.

Figure 13:
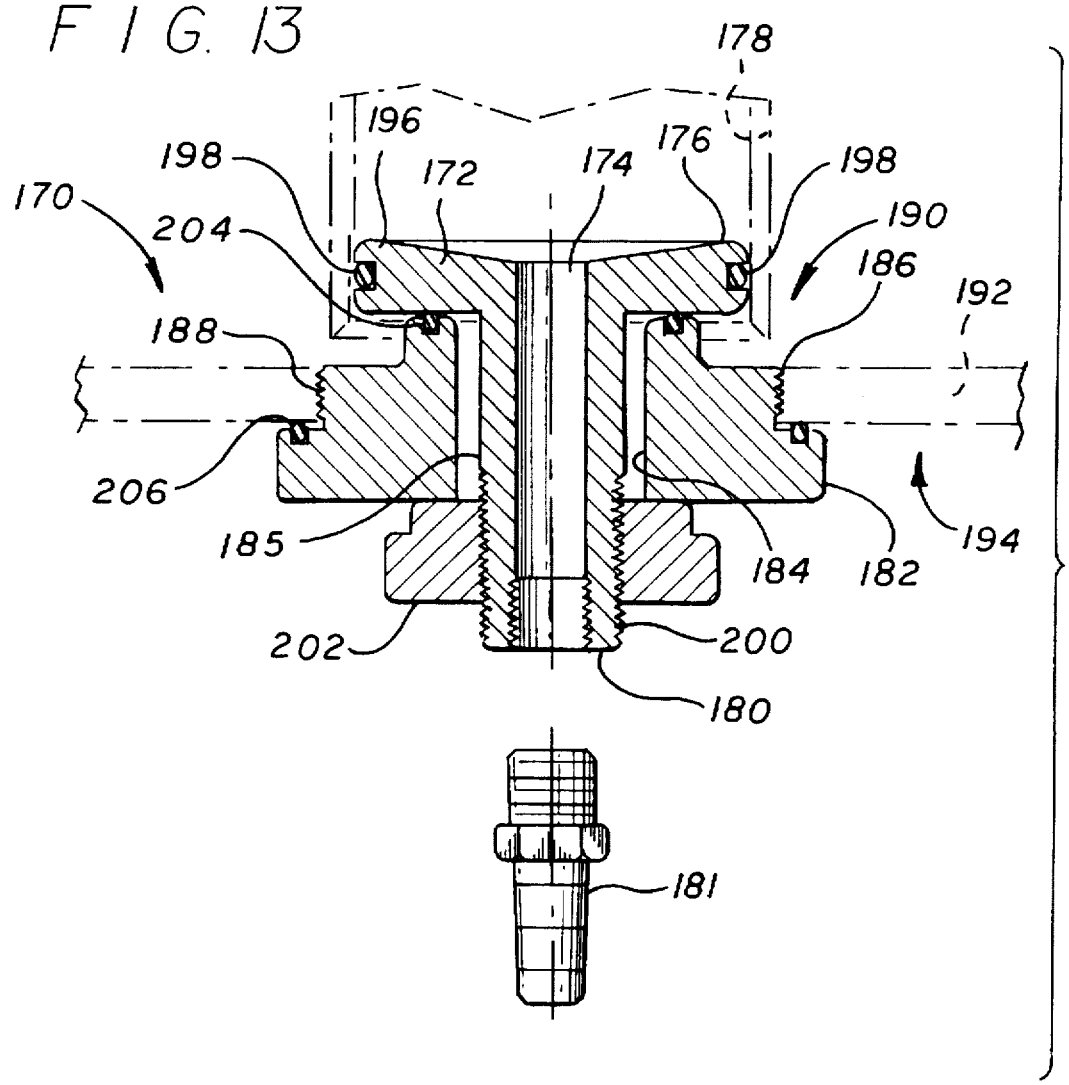
FIG. 13 is a cross sectional view of an alternative embodiment of the oil filter port adapter of the invention.

An alternative preferred embodiment of the filter port adapter assembly, adapted to be connected internally to a recessed cartridge type filter port, is illustrated in FIG. 13. In this embodiment, the filter port adapter assembly 170 comprises a first filter port adapter member 172 having an internal fluid passageway 174, a flared first end 176 adapted to be placed within the filter port 178 of the engine for fluid communication with the filter port, and a second end 180 adapted to be connected in fluid communication with a quick connect coupling member 181 for connection to the conduit 24 connected to the flushing apparatus. An oil pan adapter member 182 having an internal passageway 184 for receiving the second end 180 and hub 185 of the first filter port adapter member is also provided. The oil pan adapter member has external threads 186 at the outer periphery of the oil pan adapter member to be connected within corresponding internal threads 188 in an opening 190 of the outer cover 192 of the oil pan 194. The first end of the first filter port adapter member includes a flange 196 having a peripheral O-ring 198 for sealing the internal connection within the filter port 178. The second end of the first filter port adapter member preferably includes external threads 200 for accepting an internally threaded nut 202 for securing the first filter port adapter member to the oil pan adapter member in a fluid tight seal. O-ring seals 204 and 206 are also provided on the oil pan adapter member with the flange of the first filter port adapter member and with the drain pan.

Figure 14:
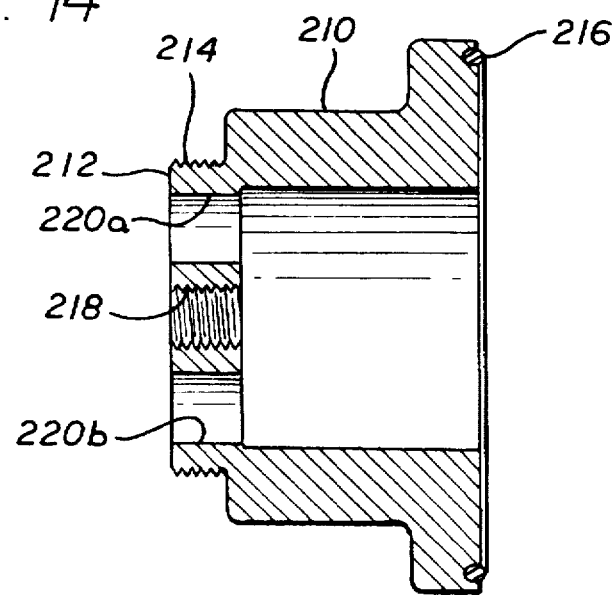
FIG. 14 is a cross-sectional view of an alternative embodiment of a principal adapter for use with the oil filter assembly of FIG. 3.

As is illustrated in FIG. 14, an alternate embodiment of a principal adapter 210 is provided to interface with an oil filter port for a bolt-mounted exterior type of cartridge filter (not shown). The principal adapter 210 is typically formed of aluminum, has a generally cylindrical shape, and has a protruding cylindrical portion 212 or hub having a threaded outer surface 214 for connection to a correspondingly threaded portion of the base member 62 shown in FIG. 3. An O-ring seal 216 is provided in an annular groove at the other end of the principal adapter 210 for sealing engagement with the oil filter port surface of the engine. A circular axially extending passage 218 is located within hub 212 of the principal adapter 210, and is internally threaded for connection to corresponding threads on the mounting bolt (not shown) for the cartridge-type filter. A plurality of fluid passages 220a, b are symmetrically distributed about and equidistant from the axis through the axial passage 218.

Figure 15:
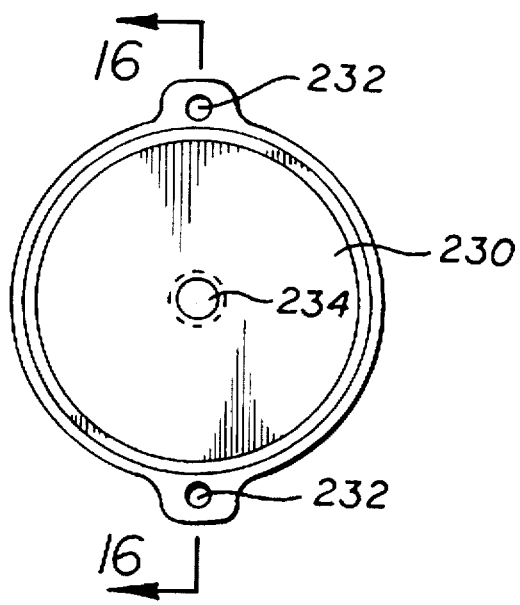
FIG. 15 is a plan view of a cover plate adapter for a cartridge-type recessed oil filter port.
Figure 16:
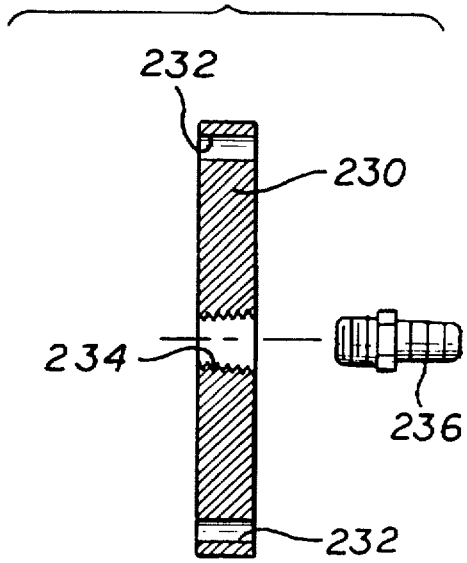
FIG. 16 is a cross-sectional view of the cover plate adapter taken along line 16—16 of FIG. 15.
Figure 18:
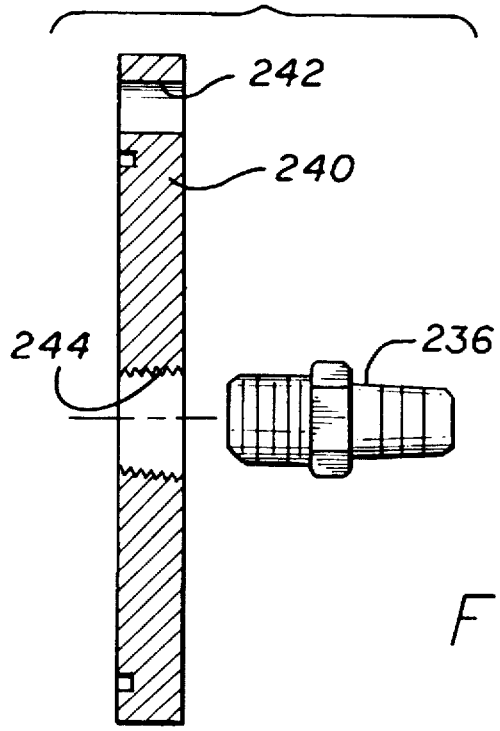
FIG. 18 is a cross-sectional view of the cover plate adapter taken along line 18—18 of FIG. 17.

For engines having a cartridge-type oil filter that is mounted externally to the engine by bolts, a cover plate adapter 230 shown in FIGS. 15 and 16, with two bolt holes 232, or alternatively a cover plate adapter 240 shown in FIGS. 17 and 18, with three or more bolt holes 242, can typically be fitted over the oil filter port (not shown) of the engine, and bolted in place of the cartridge-type filter. The cover plate adapters 230, 240 preferably include an aperture 234, 244, respectively, for receiving a quick-connect coupling member 236 to be connected to the first conduit 24.

For engines having an oil filter port mounting post that is designed to extend well into a spin-type oil filter, the stem of the oil filter post can extend typically 3 inches beyond the threads of the oil filter mounting post 58 shown in FIG. 2. In this case, an intermediate adapter 250 illustrated in FIG. 19, typically formed of aluminum, and having a generally cylindrical shape, can be inserted between the universal adapter coupling 60, 62 and the primary adapter 64, shown in FIG. 3. The intermediate adapter has a protruding cylindrical portion 252 or hub having a threaded outer surface 254 for connection to the corresponding threads of base member 62. Internal threads 256 are also provided in the opening 258 of the intermediate member for connection to the corresponding threads 92 of the principal adapter. An O-ring seal 260 is also provided in an annular groove at the end of the intermediate adapter for sealing connection to the principal adapter.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In an improved engine flushing system for circulating flushing fluid through an internal combustion engine to clean said internal combustion engine, said engine being of the type containing an engine block, an oil drain pan having an oil drain plug port and an oil filter port on said engine block, said oil filter port including a first oil passage into said engine block for routing oil from the oil filter port to the crankshaft and other internal engine components and a second oil passage for routing fluid from the drain pan and oil pump to said oil filter port, said flushing system including flushing apparatus for delivering a volume of flushing fluid and receiving used flushing fluid, a first conduit for conducting flushing fluid from said flushing apparatus to said oil filter port and second conduit for conducting flushing fluid from said oil drain plug port to said flushing apparatus, the improvement comprising:

an oil filter port adapter assembly for connecting said first conduit to the oil filter port, said oil filter port adapter assembly including a plurality of adapter members, said plurality of adapter members including a primary adapter assembly having a base portion, and a secondary adapter fitting to the oil filter port of substantially most internal combustion engines and creating a liquid tight seal therewith;

a plurality of indexing pins for releasably indexing at least two of said plurality of adapter members together, each of said indexing pins having first and second ends, said primary adapter assembly having a plurality of primary adapter indexing pin receptacles, said first ends of said indexing pins being disposed in said primary adapter indexing pin receptacles, and a plurality of secondary adapter indexing pin receptacles provided in said secondary adapter for releasably receiving said second ends of said indexing pins in sliding fit engagement; and a drain pan port adapter assembly fitting the drain pan port of substantially said internal combustion engine and creating a liquid tight seal therewith.

2. The improved engine flushing system of claim 1, wherein said primary adapter assembly comprises of a plurality of adapter members for use in combination with said secondary adapter.

3. The improved engine flushing system of claim 1, further including a coupling means extending through the base portion of the primary adapter assembly and said secondary adapter for connection to the oil filter port.

4. The improved engine flushing system of claim 1, wherein said base portion of said primary adapter assembly further comprises conduit coupling means for coupling the primary adapter assembly to the first conduit from the flushing equipment.

5. The improved engine flushing system of claim 1, wherein said drain pan port adapter assembly includes a right angle base portion having a bevelled shoulder configuration for fitting in restricted spaces of an engine compartment.

6. An engine flushing system for circulating flushing fluid through an internal combustion engine to clean said internal combustion engine, said engine being of the type containing an engine block, an oil drain pan having an oil drain plug port and an oil filter port on said engine block, said oil filter port including a first oil passage into said engine block for routing oil from the oil filter port to the crankshaft and other internal engine components and a second oil passage for routing fluid from the drain pan and oil pump to said oil filter port, said flushing system including flushing apparatus for delivering a volume of flushing fluid and receiving used flushing fluid, a first conduit for conducting flushing fluid from said flushing apparatus to said oil filter port and second conduit for conducting flushing fluid from said oil drain plug port to said flushing apparatus, said oil filter port being a cartridge-type port recessed within the drain pan, and said drain pan having an internally threaded opening for access to said oil filter port, said engine flushing system comprising:

a first filter port adapter member having an internal fluid passageway, a first end adapted to be placed within the oil filter port of the engine for fluid communication therewith, and a second end adapted to be connected in fluid communication with the first conduit connected to the flushing apparatus, said first end of the first filter port adapter member including a flange having a peripheral O-ring for sealing connection within said the oil filter port; and a second filter port adapter member having an internal passageway for receiving the second end of the first filter port adapter member, said second filter port adapter member being correspondingly externally threaded to be connected within said internally threaded opening of the drain pan.

7. The engine flushing system of claim 6, wherein said second end of said first filter port adapter member is externally threaded for accepting an internally threaded nut for securing the first filter port adapter member to the second filter port adapter member in a fluid tight seal.

8. The engine flushing system of claim 6, wherein said second filter port adapter member further comprises a first O-ring seal for sealing engagement of the second filter port adapter member with said flange of the first filter port adapter member and a second O-ring seal for sealing engagement of the second filter port adapter member with the drain pan of the engine.

9. In an adapter assembly for use with an internal combustion engine flushing apparatus for connection of first and second conduits to the apparatus, said first conduit being in fluid communication with an oil filter port leading to a lubrication system of the internal combustion engine including an oil drain pan, and said second conduit leading from an oil drain pan port of the internal combustion engine, the improvement in said adapter assembly comprising:

an oil filter port adapter assembly for connecting said first conduit to the oil filter port, said oil filter port adapter assembly including a primary adapter assembly having a base portion and conduit coupling means for coupling the primary adapter assembly to the first conduit from the flushing equipment, and a secondary adapter connected to said primary adapter assembly in a low tolerance sliding fit, said secondary adapter fitting to the oil filter port of the internal combustion engine and creating a liquid tight seal therewith;

a plurality of indexing pins for releasably indexing said secondary adapter to said primary adapter assembly, each of said indexing pins having first and second ends, said primary adapter assembly having a plurality of primary adapter indexing pin receptacles in which said first ends of said indexing pins are disposed, and a plurality of secondary adapter indexing pin receptacles provided in said secondary adapter for releasably receiving said second ends of said indexing pins in sliding fit engagement; and a drain pan port adapter assembly fitting the drain pan port of said internal combustion engine and creating a liquid tight seal therewith.

10. The improved engine flushing system of claim 9, wherein said primary adapter assembly comprises of a plurality of adapter members for use in combination with said secondary adapter fitting to the oil filter port and creating a liquid tight seal therewith.

11. The improved engine flushing system of claim 9, further including a coupling means extending through the base portion of the primary adapter assembly for connection to the oil filter port.

12. The improved engine flushing system of claim 9, wherein said base portion of said primary adapter assembly further comprises conduit coupling means for coupling the primary adapter assembly to the first conduit from the flushing equipment.

13. The improved engine flushing system of claim 9, wherein said drain pan port adapter assembly includes a right angle base portion having a bevelled shoulder configuration for fitting in restricted spaces of an engine compartment.

14. An adapter assembly for use with an internal combustion engine flushing apparatus for connection of first and second conduits to the apparatus, said first conduit being in fluid communication with an oil filter port leading to a lubrication system of the internal combustion engine including an oil drain pan, and said second conduit leading from an oil drain pan port of the internal combustion engine, the adapter assembly comprising:

an oil filter port adapter assembly for connecting said first conduit to the oil filter port, said oil filter port adapter assembly including a primary adapter assembly having a base portion and conduit coupling means for coupling the primary adapter assembly to the first conduit from the flushing equipment, and a secondary adapter adapted to be connected to said primary adapter assembly in a low tolerance sliding fit, said secondary adapter being adapted for fitting to the oil filter port of the internal combustion engine and creating a liquid tight seal therewith;

a plurality of indexing pins for releasably indexing said secondary adapter to said primary adapter assembly, each of said plurality of indexing pins having first and second ends, said primary adapter assembly including a plurality of primary adapter indexing pin receptacles in which said first ends of said indexing pins are disposed, and each said secondary adapter including a plurality of secondary adapter indexing pin receptacles for receiving said second ends of said indexing pins in a low tolerance sliding fit engagement; and a drain pan port adapter assembly fitting the drain pan port of said internal combustion engine and creating a liquid tight seal therewith.

15. The adapter assembly of claim 14, further including coupling means extending through the base portion of the primary adapter assembly for connection to the oil filter port.

16. The adapter assembly of claim 14, wherein said base portion of said primary adapter assembly further comprises conduit coupling means for coupling the primary adapter assembly to the first conduit from the flushing equipment.

17. The adapter assembly of claim 14, wherein said drain pan port adapter assembly includes a right angle base portion having a bevelled shoulder configuration for fitting in restricted spaces of an engine compartment.

* * * * *

UNITED STATES PATENT AND TRADEMARK OFFICE
CERTIFICATE OF CORRECTION

PATENT NO. : 5,791,310
DATED : Aug. 11, 1998
INVENTOR(S) : Victor A. Grigorian, Martin Renwick, Semour Seplow It is certified that error appears in the above-indentified patent and that said Letters Patent is hereby corrected as shown below:

Title page, "Inventors:", after "Martin Renwick add --Sherman Oaks--, and after Seymor Seplow delete "both of Sherman Oaks", and add --Studio City--.

Signed and Sealed this

Twenty-ninth Day of August, 2000

Attest:

Q. TODD DICKINSON

*Attesting Officer*

*Director of Patents and Trademarks*